US011101750B2

(12) United States Patent
Marth et al.

(10) Patent No.: US 11,101,750 B2
(45) Date of Patent: Aug. 24, 2021

(54) PIEZOELECTRIC DRIVE WITH AT LEAST TWO INDEPENDENT DRIVE SECTIONS

(71) Applicant: Physik Instrumente (PI) GmbH & Co. KG, Karlsruhe (DE)

(72) Inventors: Harry Marth, Waldbronn (DE); Dominik Bocskai, Iffezheim (DE)

(73) Assignee: PHYSIK INSTRUMENTE (PI) GMBH & CO. KG, Karlsruhe (DE)

( * ) Notice: Subject to any disclaimer, the term of this patent is extended or adjusted under 35 U.S.C. 154(b) by 449 days.

(21) Appl. No.: 16/084,551

(22) PCT Filed: Mar. 15, 2017

(86) PCT No.: PCT/EP2017/056114
§ 371 (c)(1),
(2) Date: Sep. 12, 2018

(87) PCT Pub. No.: WO2017/158017
PCT Pub. Date: Sep. 21, 2017

(65) Prior Publication Data
US 2019/0074778 A1    Mar. 7, 2019

(30) Foreign Application Priority Data
Mar. 15, 2016  (DE) .................. 10 2016 104 803.8

(51) Int. Cl.
*H02N 2/06* (2006.01)
*H01L 41/08* (2006.01)
(Continued)

(52) U.S. Cl.
CPC ............ *H02N 2/062* (2013.01); *H01L 41/08* (2013.01); *H02N 2/0025* (2013.01); *H02N 2/02* (2013.01);
(Continued)

(58) Field of Classification Search
CPC .......... H02N 2/04; H02N 2/062; H02N 2/067; H02N 2/026; H02N 2/0025; H02N 2/021;
(Continued)

(56) References Cited

U.S. PATENT DOCUMENTS 4,613,782 A  9/1986 Mori et al.
5,563,465 A  10/1996 Nakahara et al.
(Continued)

FOREIGN PATENT DOCUMENTS

CN  102075111 A  5/2011
JP  S60-200776 A  10/1985
(Continued)

OTHER PUBLICATIONS

Office Action dated Sep. 9, 2019, by the European Patent Office in corresponding European Patent Application No. 17 711 143.2-1212. (3 pages).
(Continued)

*Primary Examiner* — Emily P Pham
(74) *Attorney, Agent, or Firm* — Buchanan Ingersoll & Rooney PC

(57) ABSTRACT

A piezoelectric stepper drive includes a piezoelectric drive apparatus with at least two drive sections, each acted upon by at least two piezoelectric actuators, and a driven member which is advanced by at least one of the drive sections when control voltages are applied to the actuators. The drive apparatus is configured approximately in the shape of a triangle, at the tip of which the drive sections are arranged. At least one of the drive sections is biased against the driven member, in the absence of control voltages applied to the actuators, such that the drive section blocks advance of the
(Continued)

driven member, where each of the drive sections is mounted individually resilient relative to a base of the triangle.

17 Claims, 11 Drawing Sheets

(51) Int. Cl.
*H02N 2/04* (2006.01)
*H02N 2/02* (2006.01)
*H02N 2/00* (2006.01)

(52) U.S. Cl.
CPC .............. *H02N 2/021* (2013.01); *H02N 2/025* (2013.01); *H02N 2/026* (2013.01); *H02N 2/04* (2013.01); *H02N 2/067* (2013.01)

(58) Field of Classification Search
CPC .......... H02N 2/02; H02N 2/025; H02N 2/101; H01L 41/08; H01L 41/09
See application file for complete search history.

(56) References Cited

U.S. PATENT DOCUMENTS

| | | | | |
|---|---|---|---|---|
| 6,967,430 | B2 * | 11/2005 | Johansson | H01L 41/0946 310/328 |
| 7,417,358 | B2 * | 8/2008 | Sugahara | B65H 5/008 310/328 |
| 2004/0178699 | A1 | 9/2004 | Nakanishi | |

FOREIGN PATENT DOCUMENTS

| | | |
|---|---|---|
| JP | S 62-58883 A | 3/1987 |
| JP | H01-107670 A | 4/1989 |
| JP | 02146971 A | 6/1990 |
| JP | H06-303782 A | 10/1994 |

OTHER PUBLICATIONS

Office Action (Notice of Grounds of Rejection) dated Nov. 19, 2019, by the Japanese Patent Office in corresponding Japanese Patent Application No. 2018-548918, and a partial English Translation of the Office Action. (19 pages).

Office Action (Notice of Preliminary Rejection) dated Oct. 22, 2019, by the Korean Patent Office in corresponding Korean Patent Application No. 10-2018-7029603, and a partial English Translation of the Office Action. (11 pages).

Partial English Translation of the Israeli Office Action (Notification of Prior to Examination) dated Oct. 27, 2019, by the Israeli Patent Office in corresponding Israeli Patent Application No. 261279. (4 pages).

German Search Report dated Oct. 7, 2016, in the corresponding German Patent Application No. 10 2016 104 803.8. (10 pages).

International Search Report (PCT/ISA/210) dated Jun. 14, 2017, by the European Patent Office as the International Searching Authority for International Application No. PCT/EP2017/056114.

Written Opinion (PCT/ISA/237) dated Jun. 14, 2017, by the European Patent Office as the International Searching Authority for International Application No. PCT/EP2017/056114.

Office Action dated May 11, 2020, by the European Patent Office in corresponding European Patent Application No. 17711143.2. (41 pages).

Office Action (Notice of Preliminary Rejection) dated Apr. 29, 2020, by the Korean Patent Office in corresponding Korean Patent Application No. 10-2018-7029603, and an English Translation of the Office Action. (5 pages).

Office Action (Notice of Preliminary Rejection) dated Nov. 26, 2020, by the Korean Patent Office in corresponding Korean Patent Application No. 10-2018-7029603, and an English Translation of the Office Action. (5 pages).

* cited by examiner (a)

(c)

Fig. 9
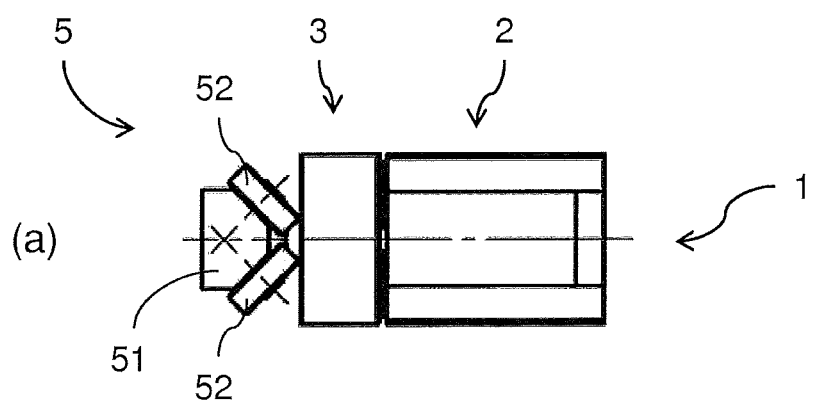
(a)
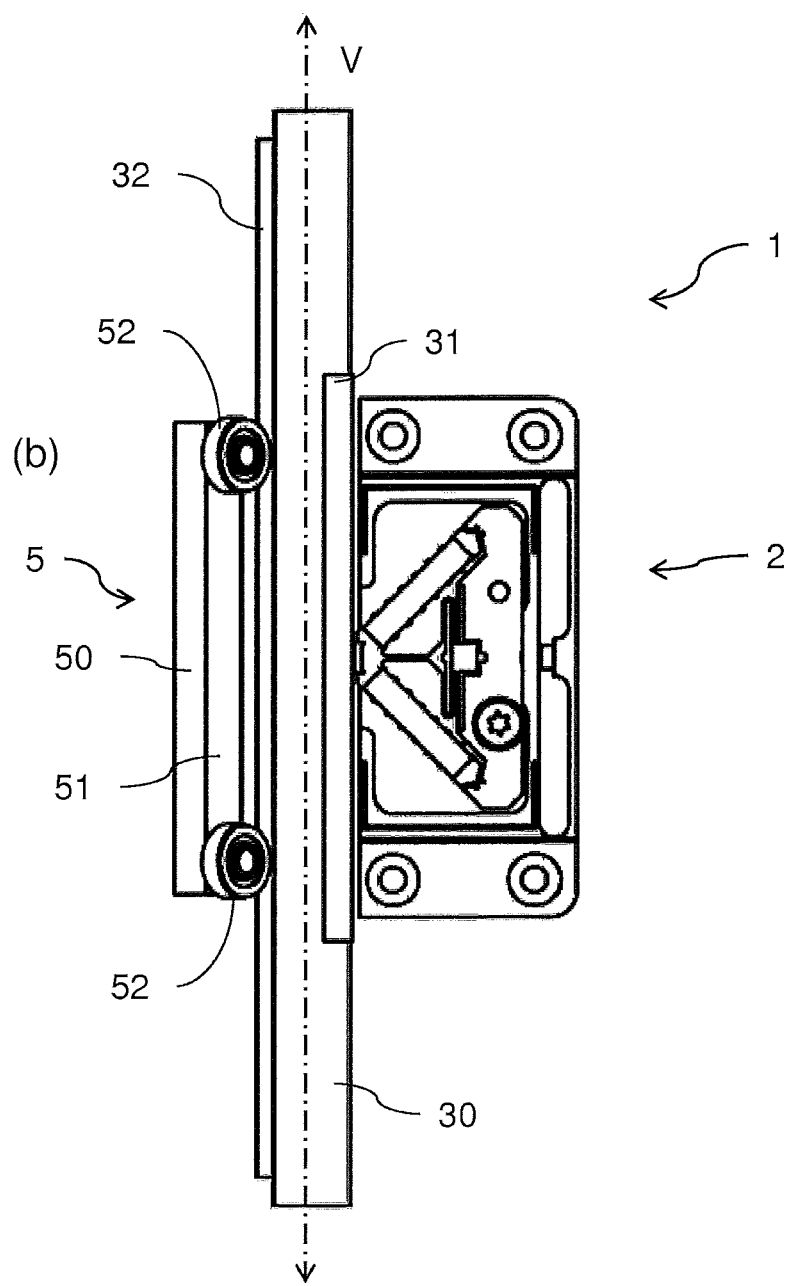
(b)

PIEZOELECTRIC DRIVE WITH AT LEAST TWO INDEPENDENT DRIVE SECTIONS

The present invention relates to a piezoelectric stepper drive including at least one piezoelectric drive apparatus with at least two drive sections which are drivable independently of each other and each acted upon by at least two piezoelectric actuators, and a driven member which is advanced by at least one of the drive sections when control voltages are applied to the actuators.

A piezoelectric stepper drive is known from JP H02-146971 A.

A piezoelectric stepper drive is known from U.S. Pat. No. 4,613,782, where piezoelectric drive apparatuses each comprise a drive section which is acted upon by the two piezoelectric actuators and biased by a spring. The drive sections are distributed along the advance direction of the driven member.

A piezoelectric stepper drive is known from U.S. Pat. No. 5,563,465 comprising at least one piezoelectric drive apparatus with at least two drive sections which are drivable independently of one another and each acted upon by at least two piezoelectric actuators, and a driven member which is advanced by at least one of the drive sections when control voltages are applied to the actuators.

It has proven to be disadvantageous with this piezoelectric stepper drive that precise control of the advance of the driven member becomes difficult due to its inertia.

The present invention is based on the object of improving a piezoelectric stepper drive to the extent that more precise control of the advance of the driven member is enabled.

The piezoelectric stepper drive according to the invention comprises at least one piezoelectric drive apparatus with at least two drive sections which are drivable independently of each other and each acted upon by at least two piezoelectric actuators, and a driven member which is advanced by at least one of the drive sections when control voltages are applied to the actuators, where at least one of the drive sections is biased against the driven member, in the absence of control voltages applied to the actuators, such that the drive section blocks the advance of the driven member. The biasing forces of both drive sections preferably act substantially perpendicular or exactly perpendicular to the advance direction (also: drive direction) of the driven member. The drive sections are deflectable independently by applying control voltages to the piezoelectric actuators in order to reduce or completely cancel the biasing forces applied to the driven member and to transmit drive forces to the driven member to provide advancement or an advance motion, respectively. The drive sections of each drive apparatus are preferably adjacently arranged transverse or perpendicular to the advance direction of the driven member.

Essential components of the piezoelectric stepper drive according to the invention are accordingly several piezoceramic actuators which act upon the respectively associated drive sections which are biased against the movably guided driven member. By way of coordinated control voltages, with which the two actuators associated with a drive section are acted upon, a kind of stepping motion of the drive sections is obtained which leads to an advance of the driven member. The use of piezoelectric actuators presently allows the smallest stepping and advance motions, so that a high motion resolution is obtained, where resolutions of well below one nanometer can be obtained with one stepping motion move. Variable regulating distance can be obtained by a variable driven member length.

The bias of at least one of the drive sections against the driven member provides the self-lock of the drive at rest and in the off state. As a result, it consumes no energy when switched off, it does not heat up and keeps the position in a mechanically stable manner. Applications with low power-on times requiring high temporal and temperature stability benefit from these features.

The motion or deformation of the piezoceramic actuators is based on crystalline effects and is not subject to wear. Coupling the drive sections to the driven member is subjected to only a very slight sliding friction effect when the driven member is advanced which is achieved solely by a physical clamping and lifting of the drive sections. This can realize very precise control of the advance of the driven member. However, an advance motion of the driven member in which the drive sections do not lift off the driven member is also possible with the stepper drive according to the invention.

It can prove to be advantageous if the drive apparatus comprises a deformable frame into which the actuators are inserted such that the two actuators respectively acting upon a drive section abut with one of their respective ends against the drive section of the frame that is common to them and with their other end are supported against a support section of the frame. The drive apparatus integrated via the frame forms a compact assembly that can be used in a flexible and versatile manner.

It can there be advantageous to have the frame comprise elastically deformable sections. With the use of elastically deformable sections, locally required flexibility or elasticity of the frame can be selectively achieved.

It can be helpful if at least one of the elastically deformable sections is configured as a spring section or as a flexure hinge, where preferably at least one of the elastically deformable sections is arranged between at least one of the support sections and a base (bearing point) of the frame and/or between at least one of the drive sections and a base (bearing point) of the frame. In particular increased flexibility or elasticity is needed in these areas of the frame, so that, firstly, the drive sections can perform a (stepping) motion due to the respective force action by the actuators associated with them, and, secondly, the actuators can be inserted into the frame in such a way that no high internal stresses arise, in particular shear stresses, or that simple alignment or assembly of the actuators in the frame is possible, respectively.

The drive apparatus is configured approximately in the shape of a triangle, at the tip of which the drive sections are arranged. The actuators preferably form the legs of the triangle, at least in sections, and are fixed to a base of the triangle in an articulated manner. Each of the drive sections is mounted in an individually resilient or elastic manner relative to the base of the triangle. The frame preferably forms an isosceles triangle, located at the tip of which are the drive sections, where the actuators form the legs of the triangle. The support sections are fixed to a base of the triangle, for example, in an articulated manner, and each of the drive sections can be connected individually to the base of the triangle by way of elastic spring sections. The actuators acting on the same drive section preferably act in working directions which at least in sections extend perpendicular and/or parallel to a plane including the advance direction of the driven member. It is desirable that the working directions of the actuators applied to the same drive section are positioned at an angle of 45° to 135°, ideally 90° relative to each other.

The drive apparatus is configured in mirror-image symmetry. This variant promotes the uniform application of the drive forces via the drive sections onto the driven member while minimizing irregularities in the advance motion. The drive apparatus is configured in mirror-image symmetry with respect to a first plane of symmetry which includes the advance direction of the driven member and extends between the drive sections of the same drive apparatus.

It can be useful if the drive apparatus is configured in mirror-image symmetry with respect to a second plane of symmetry which is aligned perpendicular to the advance direction of the driven member and intersects both drive sections of the same drive apparatus.

It can also be useful if the stepper drive comprises at least two drive apparatuses which are arranged on the same side or on different sides of the driven member, where the drive apparatuses are preferably arranged in mirror-image symmetry and/or the drive sections are deflectable in mirror-image symmetry and/or the actuators associated with the drive sections are connected in mirror-image symmetry. It can be helpful if the associated actuators of two respective drive sections of different drive apparatuses are connected in pairs and are simultaneously deflectable when the associated actuators are acted upon with control voltages to transmit rectified drive forces to accomplish the advancement towards the driven member. Symmetries with regard to the arrangement, actuation or connection of the two drive apparatuses are possibly given in the following planes of symmetry:

A first plane of symmetry which includes the advance direction of the driven member and extends in the plane of the driven member between drive sections of different drive apparatuses.

A second plane of symmetry which includes the advance direction of the driven member and respectively intersects the two drive apparatuses perpendicular to the plane of the driven member between the drive sections of the same respective drive apparatus.

A third plane of symmetry which extends perpendicular to the advance direction and perpendicular to the plane of the driven member and intersects the drive sections of both drive apparatuses.

It can prove to be advantageous if the driven member is configured and/or mounted in an elastically deformable manner and, in the absence of the control voltages at the actuators, is biased by restoring forces against the drive apparatus due to elastic deformation. This variant is advantageous if the drive apparatus acts only on one side of the driven member.

Furthermore, it can prove to be advantageous if at least one drive apparatus is arranged on a base frame, where the base frame comprises elastically deformable sections, preferably in the form of flexure hinges, so that the drive apparatus is elastically mountable to the base frame such that at least one of its drive sections, in the absence of the control voltages at the actuators, is biased by restoring forces against the drive apparatus due to elastic deformation. A defined bias of the drive sections against the driven member can be realized in a simple manner in particular with the use of adjustable screws.

It can also be useful if the at least one drive apparatus and the driven member are arranged on the same base frame, where the at least one drive apparatus and the driven member are mounted to be resilient relative to each other on the base frame. For example, the at least one drive apparatus and the driven member are arranged on different sections of the base frame which are connected to each other movably and in a resilient manner, where the different sections of the base frame are connected, for example, by way of one or more flexure hinges.

In addition, it can prove to be advantageous if the driven member is mounted and/or configured and/or the drive apparatus is mounted and/or the base frame is configured such that an increase in the biasing force between one of the drive sections of the drive apparatus and the driven member leads to a decrease in the biasing force between another drive section of this drive apparatus and the driven member. As a result, a reduction in the biasing force is achieved in a purely mechanical manner until the respective drive section is completely lifted off the driven member, which significantly simplifies the actuation of the stepper drive.

A further aspect of the present invention relates to a method for actuating a piezoelectric stepper drive according to one of the preceding embodiments, comprising the steps:

step A: actuating the second actuators associated with the at least one second drive section and optionally actuating the first actuators associated with the at least one first drive section, so that the biasing force applied to the driven member by the first drive section is reduced or cancelled;

step B: actuating the second actuators, so that the second drive section transmits drive forces onto the driven member and the driven member is advanced in the drive direction;

step C: changing the control voltages applied to the second actuators and optionally changing the control voltages applied to the first actuators to restore the contact between the first drive section and the driven member, where the first and the second drive sections are offset from each other in the drive direction of the driven member;

step D: actuating the first actuators and optionally actuating the second actuators, so that the biasing force applied to the driven member by the second drive section is reduced or canceled;

step E: actuating the first actuators, so that the first drive section transmits drive forces onto the driven member and the driven member is advanced in the drive direction;

step F: changing the control voltages applied to the first actuators and optionally changing the control voltages applied to the second actuators to restore the contact between the second drive section and the driven member; and optionally repeating steps A to F, where step B is modified for each repetition such that the second actuators and the first actuators are actuated, so that the second drive section causes an advance of the driven member in the drive direction and the first drive section preforms a motion in a direction substantially opposite to the drive direction.

The wording "optionally" indicates that the additional activation of the first or the second actuators, respectively, in steps A and D is performed optionally, preferably with a phase-shifted or inversely phased control voltage in comparison to the control voltage applied to the respective other actuators.

The method described above ensures that at least one drive section is respectively in contact with the driven member during the entire advance of the driven member. This advance is a flowing motion similar to a human walking motion, where one foot is respectively in contact with the ground. The advance motion of the driven member can therefore be optimally controlled and unintentional advance due to inertia of the driven member is eliminated. At the same time, an unintentional motion of the driven member due to its weight is reduced or eliminated. The actuation of the actuators is there at a frequency which is outside and in particular below, preferably well below, the resonance frequency of the actuators. This frequency is additionally below 20 kHz.

It can prove to be advantageous if the method described above in step B additionally includes an actuation of the first actuators, so that the first drive section performs a motion in the direction substantially opposite to the drive direction and/or in step E the second actuators are additionally actuated such that the second drive section performs a motion in a direction substantially opposite to the drive direction. The restoring motion of the drive sections thus obtained creates an even more effective and in particular more dynamic drive apparatus.

BRIEF DESCRIPTION OF THE FIGURES

FIG. 9 shows in view (a) a top view and in view (b) a side view of a piezoelectric stepper drive 1 according to a fifth embodiment of the invention, comprising a special guide device for the advance motion of the driven member which enables self-alignment of the drive apparatus relative to the driven member.

DETAILED DESCRIPTION OF THE PREFERRED EMBODIMENTS

Preferred embodiments of the invention shall be described below with reference to the accompanying figures.

Figure 1:
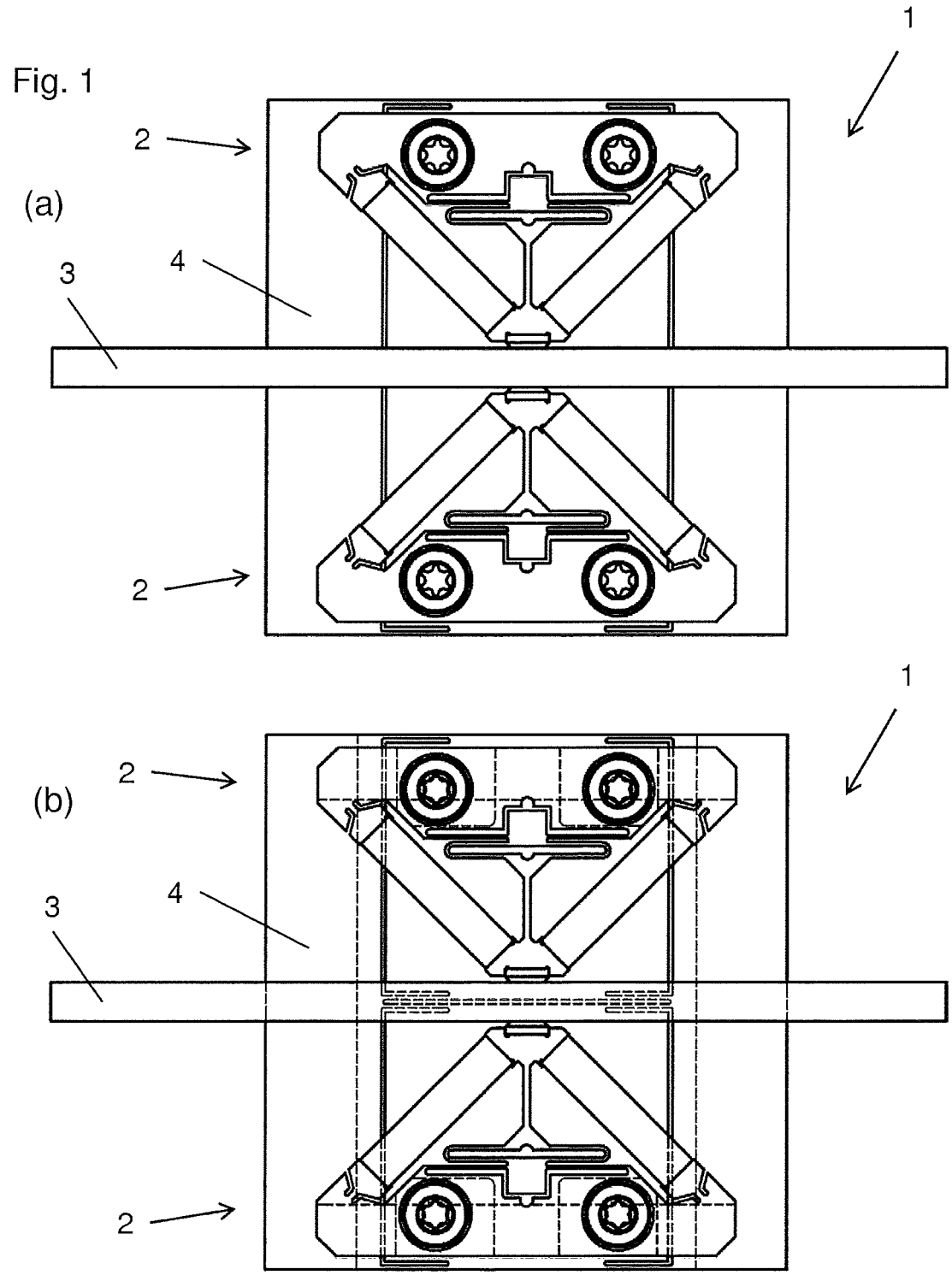
FIG. 1 shows a side view of a piezoelectric stepper drive according to a first embodiment of the invention in which two identical drive apparatuses are arranged in mirror-image symmetry oppositely disposed on different sides of the driven member, where in view (a) hidden contours are invisible and in view (b) hidden contours are illustrated to be visible.
Figure 2:
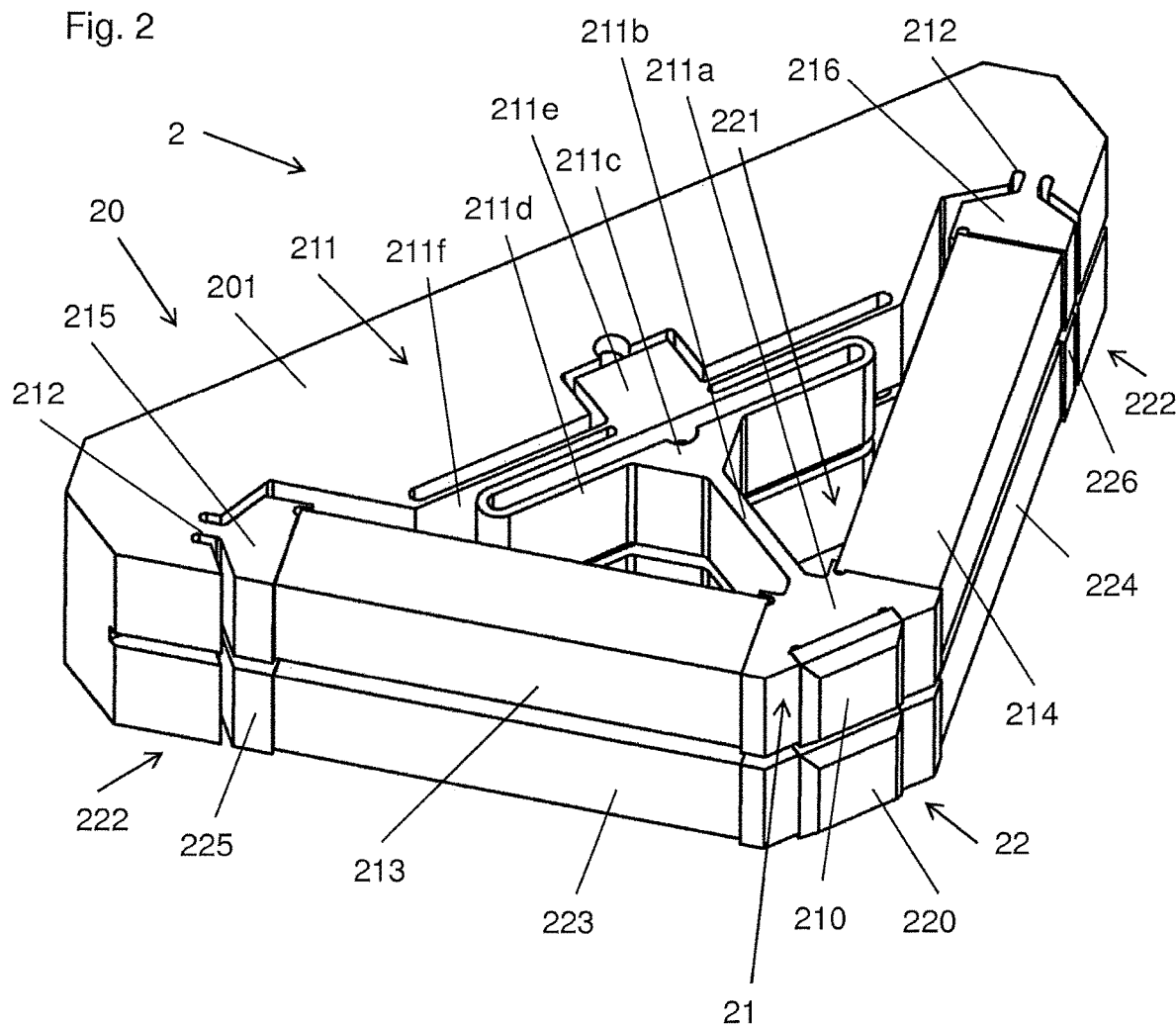
FIG. 2 shows a perspective view of a drive apparatus of a piezoelectric stepper drive according to the invention.
Figure 3:
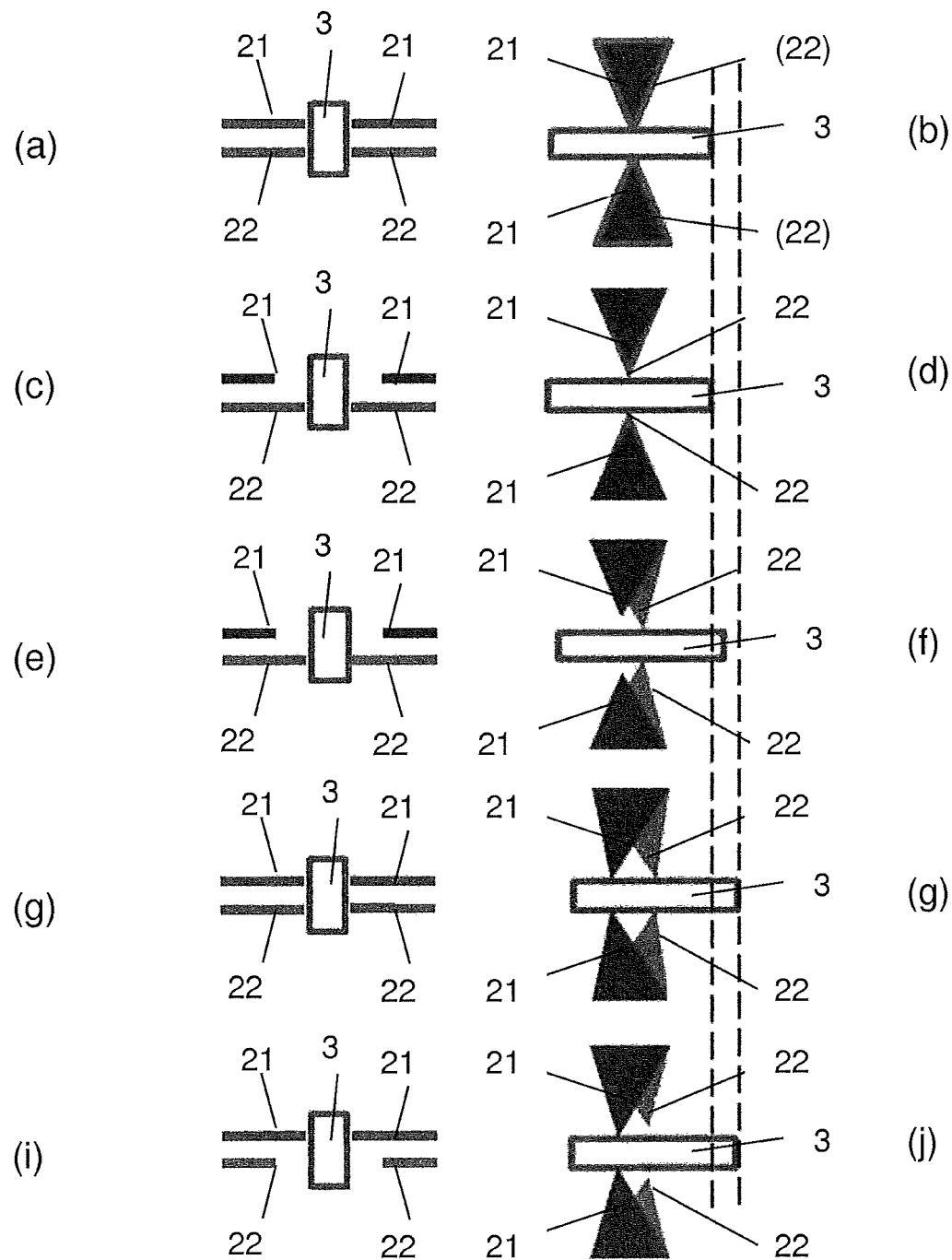
FIG. 3 shows schematic views (a to j) of the sequences of motion of the driven member and of the drive sections during the advance of the driven member, starting out from a de-energized state, in different views.

First Embodiment (FIGS. 1 to 3)

Piezoelectric stepper drive 1 according to the first embodiment of the invention shown in FIGS. 1(a) and (b) comprises two identically configured piezoelectric drive apparatuses 2 which, according to the illustration in FIG. 2, each comprise two drive sections 21, 22 which are drivable independently of each other and each acted upon by two piezoelectric actuators 213, 214, 223, 224. They are e.g. cuboid-shaped actuators 213, 214, 223, 224 with dimensions of 3×3×13.5 mm. Drive apparatuses 2 face each other arranged and connected in mirror-image symmetry in order to accommodate a driven member 3 between them which, when actuators 213, 214, 223, 224 are acted upon with respective control voltages, is advanced by at least one of drive sections 21, 22. Drive apparatuses 2 are mounted on a substantially square base frame 4 which comprises elastically deformable sections in the form of flexure hinges, as can be seen in particular with reference to FIG. 1(b). Drive apparatuses 2 are biased in FIG. 1, in a manner not shown in detail, by use of adjustable screws against driven member 3 in that parts of base frame 4 connected to each other by way of flexure hinges are clamped against each other.

Driven member 3 in the present case is a linear, nearly cuboid-shaped element with longitudinal edges which extend parallel to the direction of motion or the advance direction of driven member 3, respectively. In the absence of control voltages applied to actuators 213, 214, 223, 224, drive sections 21, 22 according to the invention are biased against driven member 3 such that they block the advance of driven member 3. The biasing forces of all drive sections 21, 22 act perpendicular to the advance direction of driven member 3.

By having control voltages act upon the respectively associated piezoelectric actuators 213, 214, 223, 224, drive sections 21, 22 can be deflected or moved independently in order to increase or reduce or completely cancel the biasing forces that they exert on driven member 3, and to transmit drive forces onto driven member 3 in order to accomplish its advancement. Drive sections 21, 22 of each drive apparatus 2 are arranged adjacently perpendicular to the advance direction of driven member 3 (one behind the other as viewed in the direction of FIG. 1, i.e. in an overlapping manner).

Due to the special configuration of base frame 4 with the flexure hinges formed integrally therewith or due to the respective arrangement of drive apparatuses 2 on base frame 4, respectively, the biasing force between a first drive section 21 and driven member 3 can be reduced or even completely canceled by way of an increase in the biasing force between a second drive section 22 and driven member 3 due to the application of appropriate control voltages. By increasing the biasing force with which second drive section 22 presses against driven member 3, the resulting counterforce, which acts via drive apparatus 2 on base frame 4, causes a displacement of the part of base frame 4 on which drive apparatus 2 is arranged relative to the respectively remaining and stationary part of base frame 4. This results in an analogous manner in a displacement of drive apparatus 2, so that first drive section 21, actuators 213, 214 of which associated therewith are not actuated or possibly actuated in a phase-shifted or inversely phased manner, can lift off (see FIG. 5c, which schematically shows the previously described mode of action based on the special case of a drive section completely lifting off).

Actuators 213, 214 associated with first drive section 21 are preferably acted upon with the control voltages phased inversely to actuators 223, 224 associated with second drive section 22 in order to amplify the effect described above, i.e. to reduce or to completely cancel the biasing force acting upon driven member 3 by way of first drive section 21. However, it is within the scope of the invention that the effect described above already occurs if only actuators 223, 224 assigned to second drive section 22 are acted upon with control voltages, and actuators 213, 214 assigned to first drive section 21 are not.

In the case described, it is assumed that the driven member 3 is substantially rigid and does not draw back or yield due to the increased biasing force of respective drive section 21, 22.

However, it is also possible for elasticity to be accomplished on the part of driven member 3 in that driven member 3 draws back with an extension of first actuators 213, 214 caused by the action of control voltages and a corresponding deflection of associated first drive section 21 with respect to an undeformed state (i.e., in the absence of control voltages). As a result, second drive section 22, the position of which remains in its original position in the absence of the control voltages at second actuators 223, 224, disengages from driven member 3. Actuators 223, 224 associated with second drive section 22 are preferably acted upon with control voltages which are phased inversely to the control voltages applied to actuators 213, 214 associated with first drive section 21 in order to enhance the effect described above, i.e. to further reduce or even completely cancel the biasing force applied by second drive section 22 onto driven member 3.

Of course, the above explanations apply accordingly where second drive section 22 is lifted off driven member 3 instead of first drive section 21.

FIG. 2 shows an isolated drive apparatus 2 which is used in the stepper drive according to the invention.

Actuators 213, 214, 223, 224 are inserted into a deformable frame 20 such that the two respective actuators 213, 214, 223, 224 acting upon a drive section 21, 22 abut with one of their respective ends against drive section 21, 22 common to them and with their other end are supported against a support section 215, 216, 225, 226 of frame 20.

Frame 20 is formed approximately in the shape of an isosceles triangle, at the tip of which drive sections 21, 22 are located. With a viewing direction onto the triangle, actuators 213, 214, 223, 224 are disposed parallel to each other offset one behind the other and form the legs of the triangle with equal lengths. Support sections 215, 216, 225, 226 are located at the corners of the triangle and are connected in an articulated manner by flexure hinges 212, 222 to a base 201 of frame 20 which corresponds to the hypotenuse of the triangle. Elastic spring sections 211, 221 connect each of drive sections 21, 22 individually and integrally to the base of the triangle. Actuators 213, 214 or 223, 224, respectively, acting on the same drive section 21 or 22, respectively, act in working directions which are at an angle of 90° relative to one another, where the apex of the angle is located in the region of the respective drive section 21, 22.

Spring sections 211, 221, which are formed integrally with frame 20, allow for the movability of drive sections 21, 22 required for driving driven member 3. At the same time, spring sections 211, 221, like flexure hinges 212, 222, allow for an alignment of the abutment surfaces of drive sections 21, 22 and support sections 215, 216, 225, 226 relative to the end surfaces of actuators 213, 214, 223, 224, so that no undesired forces—in particular shear forces or tensile forces—are introduced into the actuators due to their being clamped in frame 20 or due to the operation of the stepper drive, respectively, since the piezoceramic materials of actuators 213, 214, 223, 224 are very sensitive to such forces which can lead to their destruction.

Spring sections 211, 221 act in a resilient manner in particular in a Z-plane, which extends perpendicular to base 201 through both drive sections 21, 22, and permit resilient deflection of the respective drive sections 21, 22 in the advance direction.

The configuration and the mode of operation of spring sections 211, 221 shall be described below based on first spring section 211 associated with first drive section 21. Since both spring sections 211, 221 are configured identically, the following description applies accordingly to second spring section 221 which is associated with second drive section 22.

First spring section 211 comprises a wedge section 211a at the tip of triangular frame 20, the tip of which points downwardly toward base 201 of frame 20. Disposed on the flat side of wedge section 211a is friction nose 210 of drive section 21. Wedge section 211a on its side facing base 201 transitions into a rib-shaped web 211b which on the opposite side and facing base 201 is adjoined by a further wedge section 211c. The respective tips of the two wedge sections 211a and 211c face each other and define web 211b at the end. Web 211b is flexurally deformable and forms a flexure hinge between the two wedge sections 211a and 211c. The flat side of wedge section 211c opens into a ring-shaped first plate package 211d. Plate package 211d is formed to be resilient in the Z direction and forms an oval ring, the major axis of which extends perpendicular to the Z plane parallel to base 201 and the minor axis of which runs in the Z plane perpendicular to base 201 through friction nose 210 of drive section 21. Formed on the side of plate package 211d facing base 201 is a cube-shaped or cuboid-shaped clamping block 211e which is displaceably guided (in the Z direction) in a corresponding recess of base 201. Clamping block 211e connects first plate package 211d and a second plate package 211f and is via the latter connected to base 201. Second plate package 211f comprises two web-shaped plates which protrude substantially parallel to base 201 on different sides of clamping block 211e and are at the end side connected to base 201. Like first plate package 211d, second plate package 211f is formed to be resilient in the Z direction. In comparison to first plate package 211*d*, the plates of second plate package 211*f* have smaller material cross-sections while having a greater length. As a result, the modulus of resilience of second plate package 211*f* in the Z direction, i.e. a required force for the deflection of second plate package 211*f* in the Z direction, is smaller than the modulus of resilience of first plate package 211*d*. Clamping block 211*e* is provided with an internal thread and is fixed by an externally threaded adjustable screw with respect to base 201, where the adjustable screw is preferably manipulated from the side of base 201 facing away from clamping block 211*e* for adjusting the distance of clamping block 211*e* from base 201. Spring section 211 is integrally formed from the material of frame 20. The preferred material of the frame is plastic material with elastic properties.

By reducing the distance between clamping block 211*e* and base 201, driving section 21 is pulled in the direction toward base 201 so that wedge section 211*a* exerts a pressing force onto both actuators abutting thereagainst. By increasing the distance between clamping block 211*e* and base 201, the actuators would possibly be subjected to tension, which is to be prevented due to the sensitivity of the ceramic material of the actuators.

A method for actuating piezoelectric stepper drive 1 according to the first embodiment shall be described below with reference to FIGS. 3(*a*) to (*j*) and comprises the following steps:

Step A: Starting out from the de-energized (basic) state or resting state illustrated in views (a)=along the advance direction and (b)=perpendicular to the advance direction, in which no control voltages are applied to the actuators and drive sections 21, 22 of two oppositely disposed drive apparatuses 2 are in contact with driven member 3 while exerting a biasing force and blocking the latter, the so-called second actuators are acted upon with a control voltage by oppositely disposed second drive sections 22, this resulting in an increase in the biasing force exerted by the latter onto driven member 3. The so-called first actuators are preferably acted upon by oppositely disposed first drive sections 21 simultaneously with a phase-shifted or inversely phased control voltage. Due to a respective mounting of the drive apparatuses, the increase in biasing force applied to driven member 3 by second drive sections 22 causes a reduction in the biasing force applied to the driven member by drive sections 21, where the additional inversely phased actuation of the first actuators optionally leads to a further reduction of the biasing force upon driven member 3, so that drive sections 21 ultimately completely lift off from driven member 3 (view (c)=along the advance direction; view (d)=perpendicular to the advance direction).

Step B: Starting out from the state shown in views (c) and (d), the second actuators are acted upon with control voltages such that second drive sections 22 transmit drive forces in the advance direction onto driven member 3 when contact with driven member 3 is established and driven member 3 is advanced accordingly relative to first drive sections 21 (view (e)=along the advance direction; view (f)=perpendicular to the advance direction). By simultaneous phase-shifted or inversely phased actuation of the first actuators, first drive sections 21 can perform a motion in a direction opposite to the advance direction and thereby increase the step size. First and second drive sections 21, 22 are now disposed (slightly) offset from each other along the advance direction of driven member 3.

Step C: Starting out from the state shown in the views (e) and (f), the control voltages applied to the second actuators and optionally the control voltages applied to the first actuators are changed to restore contact between drive sections 21 and driven member 3 so that first and second drive sections 21, 22 are in contact with driven member 3 offset in the advance direction of driven member 3 and exert biasing forces onto driven member 3 (view (g)=along the advance direction; view (h)=perpendicular to the advance direction), Step D: Starting out from the state shown in views (g) and (h), the first and optionally the second actuators are now acted upon with control voltages in such a manner that the contact between second drive sections 22 and driven member 3 is released while the biasing forces applied to driven member 3 are canceled, whereas first drive sections 21 continue to exert biasing forces onto driven member 3 while being in contact with driven member 3 (view (i)=along the advance direction; view (j)=perpendicular to the advance direction).

Step E: Starting out from the state shown in views (i) and (j), the first actuators are acted upon with control voltages in such a manner that first drive sections 21 transmit drive forces in the advance direction onto driven member 3 while being in contact with driven member 3 and driven member 3 is advanced relative to the second pair of drive sections 22. The second actuators are at the same time preferably acted upon with control voltages in such a manner that second drive sections 22 in a state lifted off from driven member 3, i.e. in a contactless state, perform a motion in a direction substantially opposite to the advance direction.

Step F: A change of the control voltages applied to the first actuators and optionally a change of the control voltages applied to the second actuators is then performed to restore contact between the second drive sections and driven member 3.

Linear advancement of driven member 3 can be achieved by repeatedly performing the preceding stepper drive steps A to F A so-called analog mode can follow the stepper drive steps in which the motion of driven member 3 is effected in the same direction as drive sections 21, 22 actuated and deflected in parallel, so that only a very small travel, primarily limited due to the maximum extension of the actuators, of driven member 3 is possible which, however, offers a very high-resolution accuracy. After reaching the target position, the actuators can enter into a de-energized state and maintain it due to the bias acting upon driven member 3.

Figure 4:
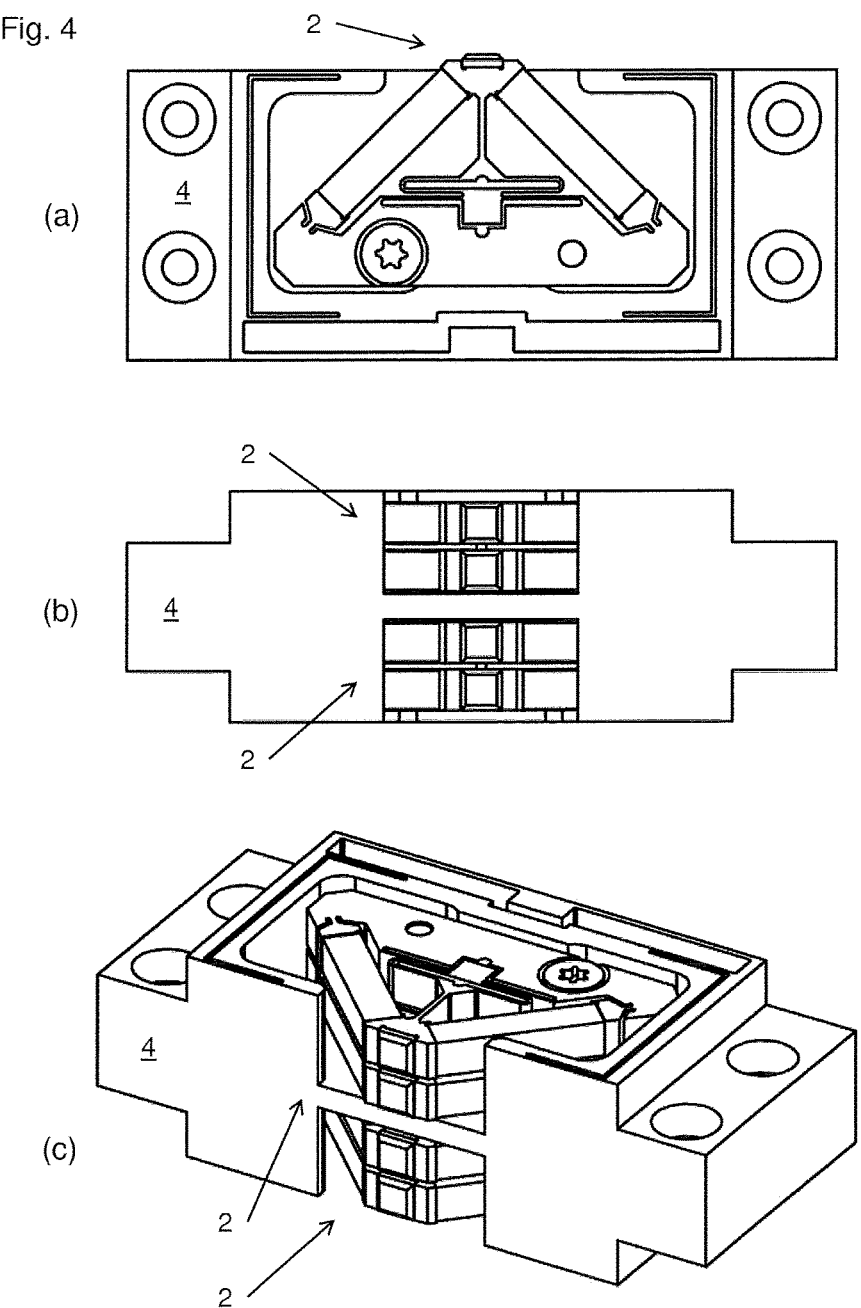
FIG. 4 shows various views (a to c) of an arrangement of drive apparatuses for a piezoelectric stepper drive according to a second embodiment of the invention, where two identical drive apparatuses are arranged offset in parallel and adjacent to each other in an overlapping manner and are adapted to act upon a driven member from the same side thereof.
Figure 5:
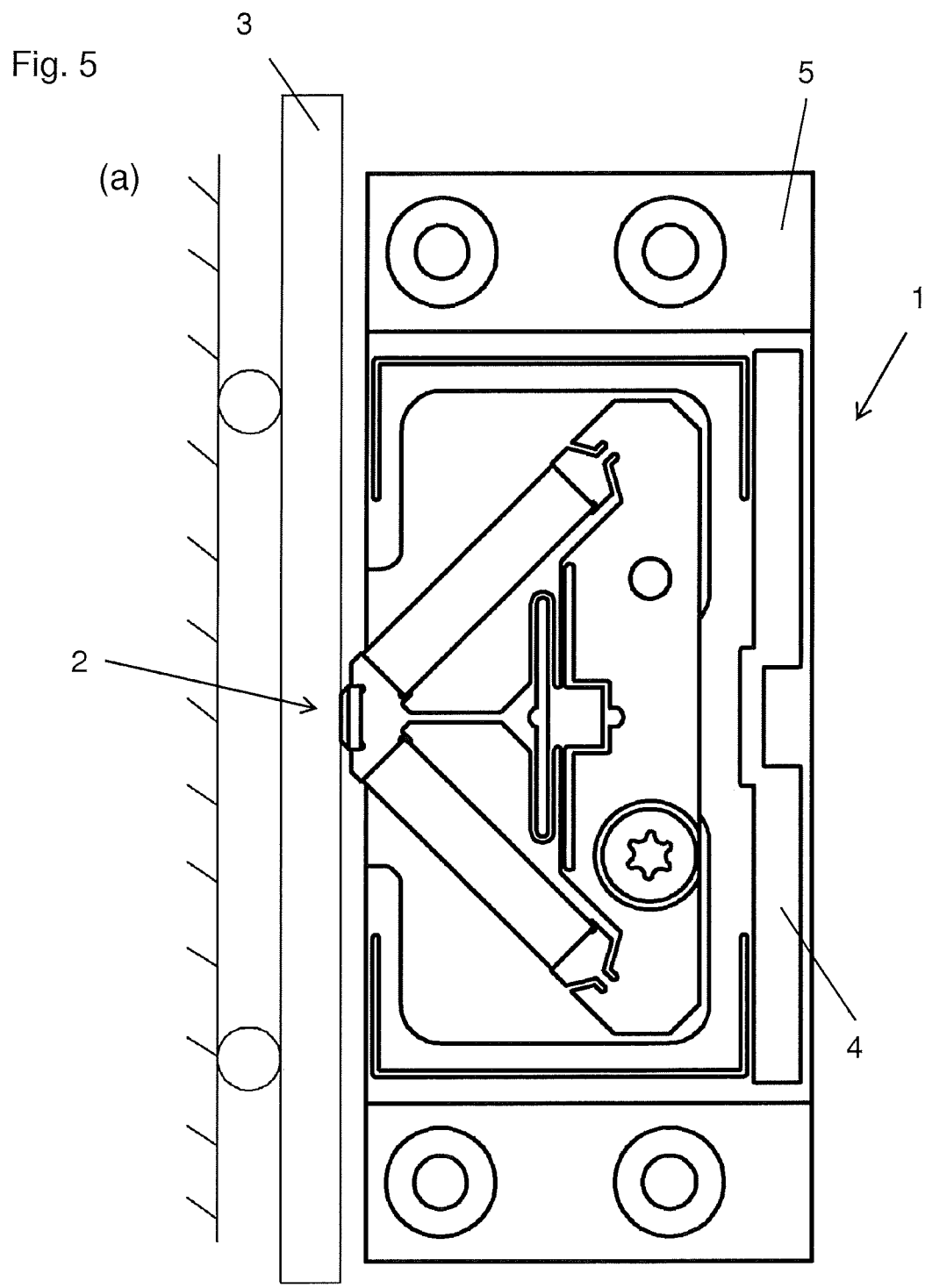
FIG. 5 shows various side views (a to c) of a piezoelectric stepper drive according to a second embodiment of the invention, where the driven member is mounted in a rolling manner relative to a fixed bearing and the drive apparatuses act upon the driven member from the same side, where view (a) is a detailed side view of the stepper drive of the invention according to the second embodiment, where view (b) shows a schematic side view of the stepper drive of view (a) in a de-energized state in the absence of control voltages applied to the actuators and view (c) is a schematic side view of the stepper drive from view (b) in a state in which the actuators associated with at least one of the drive sections are acted upon with control voltages, so that the respective drive section, by increasing the biasing force between this drive section and the driven member and subject to the deformation of a base frame supporting the drive apparatus, presses away from the driven member and the other drive section thereby lifts off from the driven member.
Figure 5:
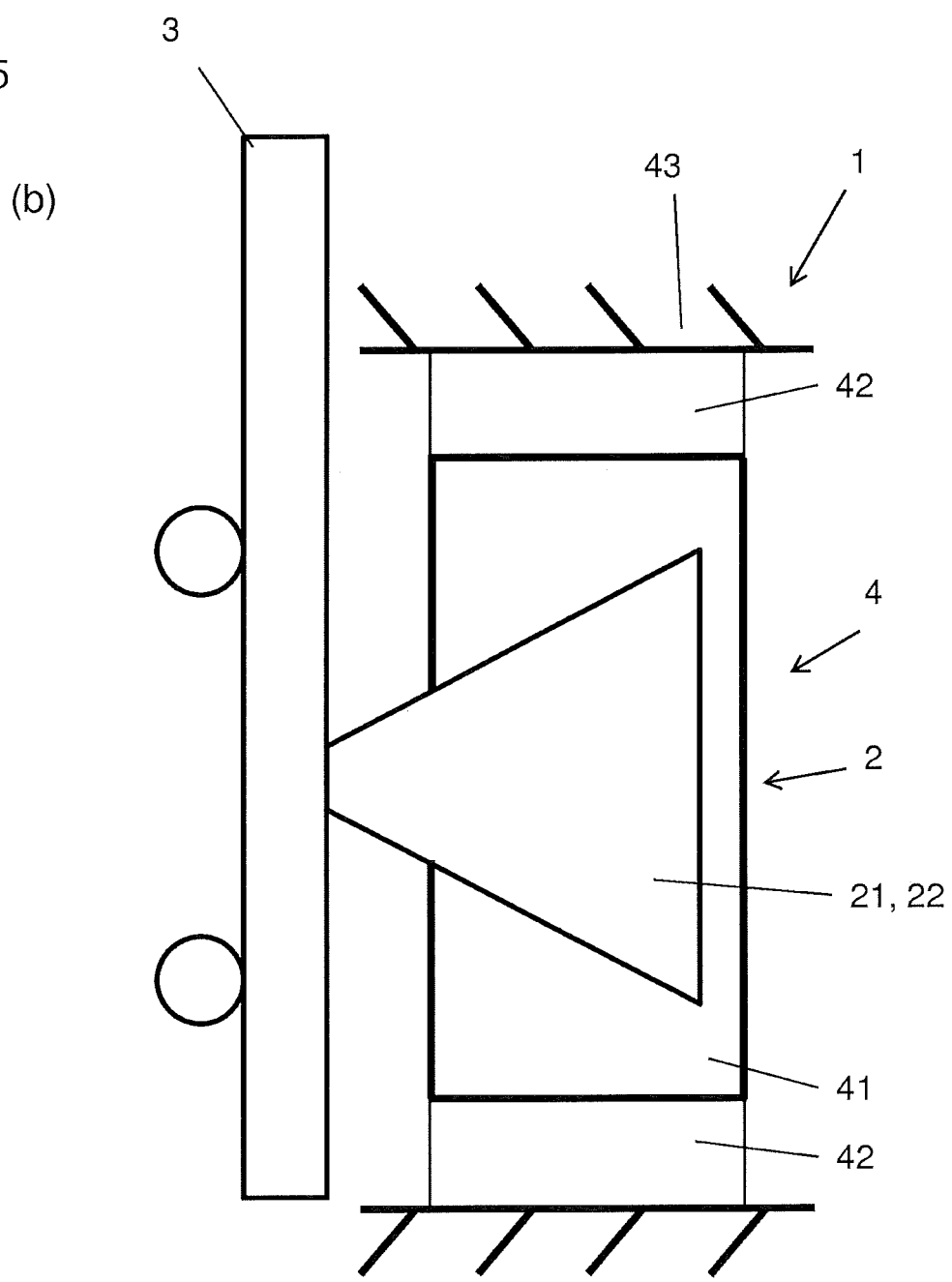
Figure 5:
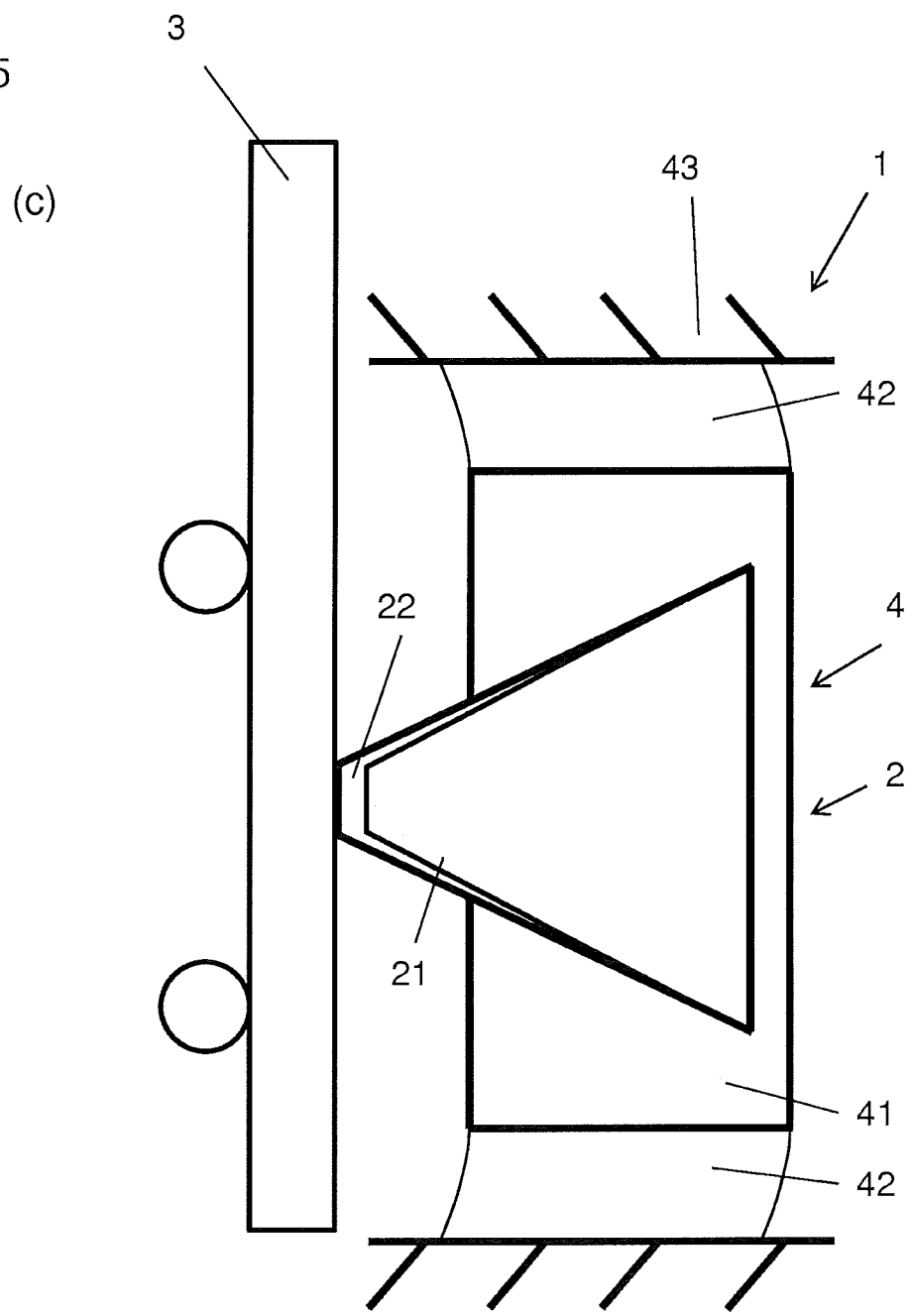
Figure 6:
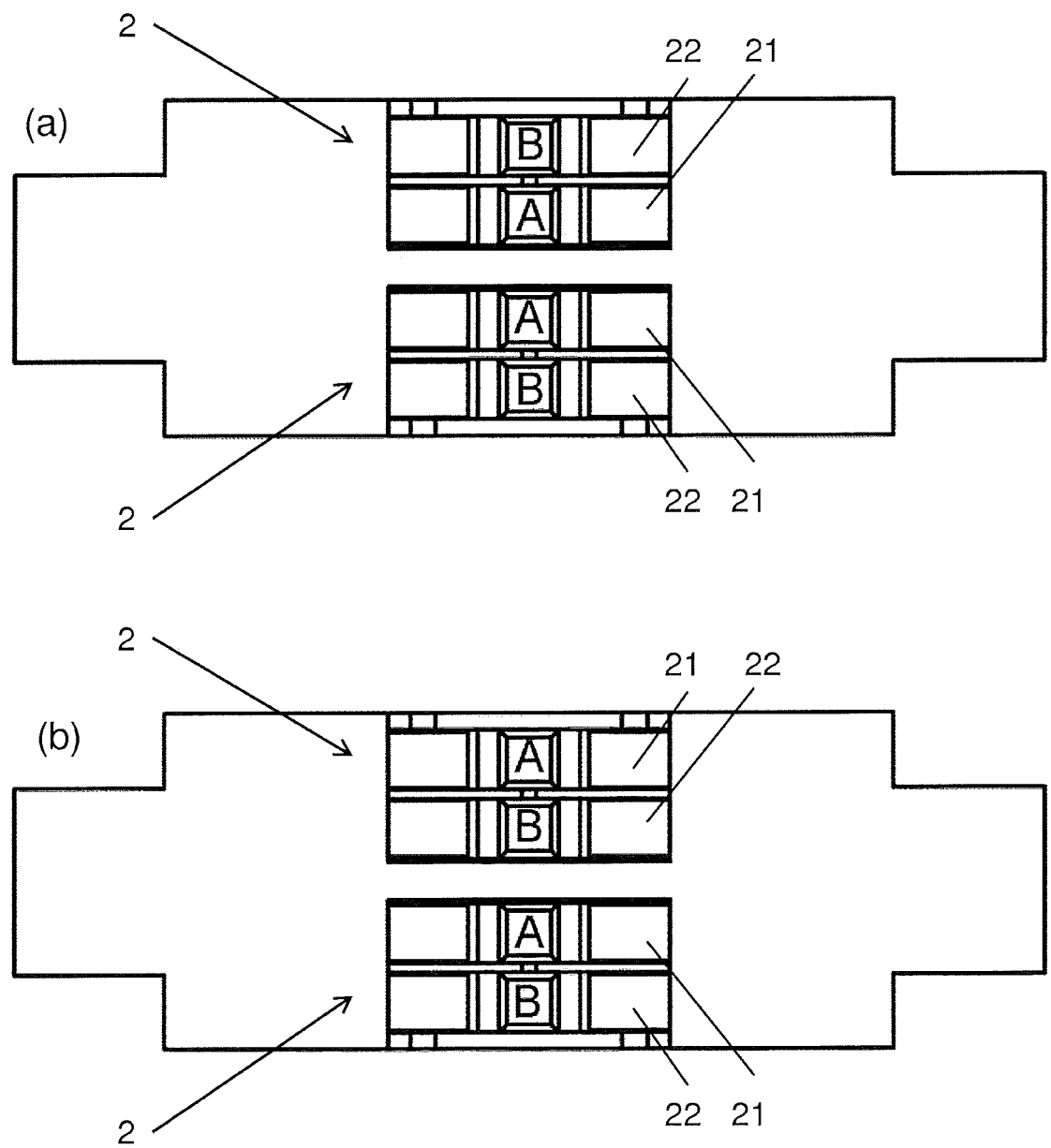
FIG. 6 shows top views of different arrangements of drive apparatuses for a piezoelectric stepper drive according to the second embodiment of the invention, where the two drive apparatuses according to view (a) are arranged or connected in mirror-image symmetry adjacent to each other and according to view (b) are arranged or connected offset in parallel from each other.

Second Embodiment (FIGS. 4 to 6)

FIG. 4 shows various views (a to c) of an arrangement of two adjacent drive apparatuses 2 for a piezoelectric stepper drive according to a second embodiment of the invention, where two identical drive apparatuses 2 are arranged offset in parallel and adjacent to each other in a manner overlapping each other and are adapted to act upon a driven member 3 from the same side thereof. Two drive apparatuses 2 are arranged in parallel and offset from one another on a base frame 4 formed integrally with an approximately cuboid-shaped housing, where base frame 4 comprises elastically deformable sections in the form of flexure hinges, with the aid of which the drive sections of drive apparatuses 2 can be biased against a driven member, presently not shown, and which allow for elastic mounting of drive apparatuses 2. The respective drive sections protrude through corresponding openings of the housing and are thereby exposed for acting upon a driven member, where they are arranged along a line. The respective base of the triangular frame of drive apparatuses 2 is fixed relative to the housing, is in particular screwed on. The open sides of the housing can be covered by respective panels.

FIG. 5 in view (a) shows a side view of a piezoelectric stepper drive according to a second embodiment of the invention, where driven member 3 is mounted rolling relative to a fixed bearing and the drive apparatuses mounted on a base frame 4 act upon driven member 3 from the same side. View (b) shows a schematic side view of the stepper drive of view (a) in a de-energized state in the absence of control voltages applied to the actuators. Drive apparatus 2 is arranged on a first section 41 of (stationary) base frame 4, where first section 41 of base frame 4 is connected via a flexure hinge 42 to a second section 43 of base frame 4 and is mounted resilient relative thereto. View (c) is a schematic side view of the stepper drive from view (b) in a state in which the actuators associated with second drive sections 22 are acted upon with control voltages, so that second drive section 22, by increasing the biasing force pushes toward driven member 3 and subject to the deformation of flexure hinge 42 pushes away from driven member 3 and first drive section 21 thereby lifts off from driven member 3.

FIG. 6 shows top views of different arrangements of drive apparatuses 2 for a piezoelectric stepper drive according to the second embodiment of the invention. Identifying the drive sections with letters A and B in views (a) and (b) relates to the phases of the motions of drive sections 21, 22, where drive sections with the same identifier perform motions of a similar kind and the respectively associated actuators are actuated in-phase, respectively. According to view (a), the actuators of two drive apparatuses 2 are actuated in mirror-image symmetry with respect to one another (BAAB arrangement), whereas, according to view (b), they are actuated parallel offset from one another (ABAB arrangement). Also conceivable is the manner of actuating the actuators associated with drive sections 21, 22 presently not shown, according to which two drive sections 21, 22 of a common drive apparatus 2 are actuated in the same direction or in an in-phase manner, where the phase of the actuating signals for the actuators of a drive apparatus 2, however, differs from that of the actuating signals for the actuators of the other drive apparatus 2 (AABB arrangement). The actuation according to view (a) is there the most advantageous due to the symmetrical introduction of forces upon the driven member.

Figure 7:
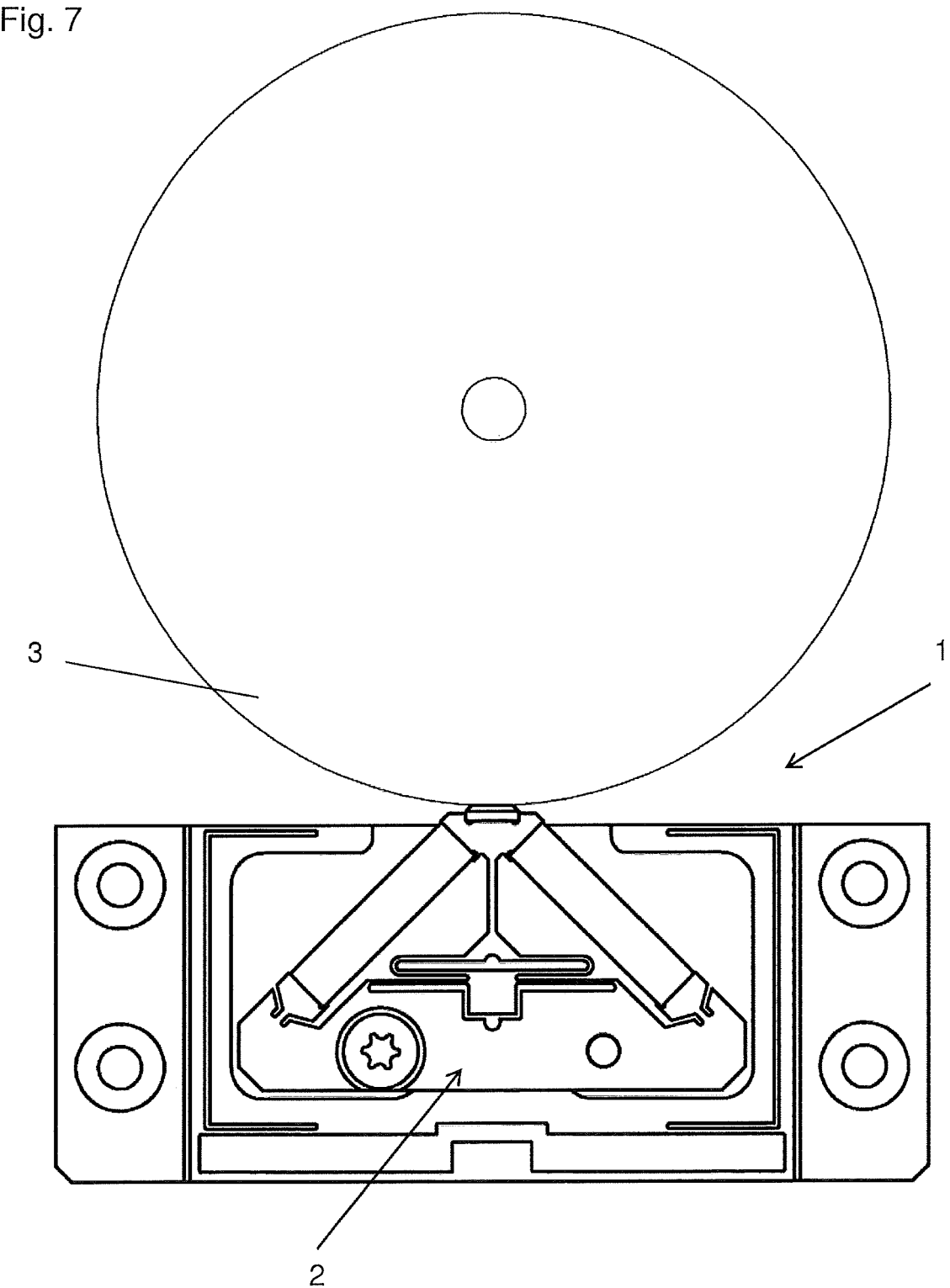
FIG. 7 shows a side view of a piezoelectric stepper drive according to a third embodiment of the invention, where the arrangement of the drive apparatus is formed to be identical to the second embodiment, but the driven member is configured as a rotary disk and the drive apparatuses act from the same side substantially radially upon the driven member configured as a rotary disk.

Third Embodiment (FIG. 7)

FIG. 7 shows a side view of a piezoelectric stepper drive 1 according to a third embodiment of the invention, where drive apparatus 2 and its arrangement in a housing configured in the same manner is formed to be identical to the second embodiment, where driven member 3, however, is configured as a rotary disk and drive apparatuses 2 act from the same side substantially radially upon driven member 3 configured as a rotary disk. In particular the parallel arrangement of the drive sections of the drive apparatus is there advantageous, which permits a linear contact with driven member 3 designed as a rotary disk, where the drive force can be increased by increasing the number of parallel juxtaposed drive apparatuses and thereby increasing the drive sections simultaneously in engagement with the friction surface.

Figure 8:
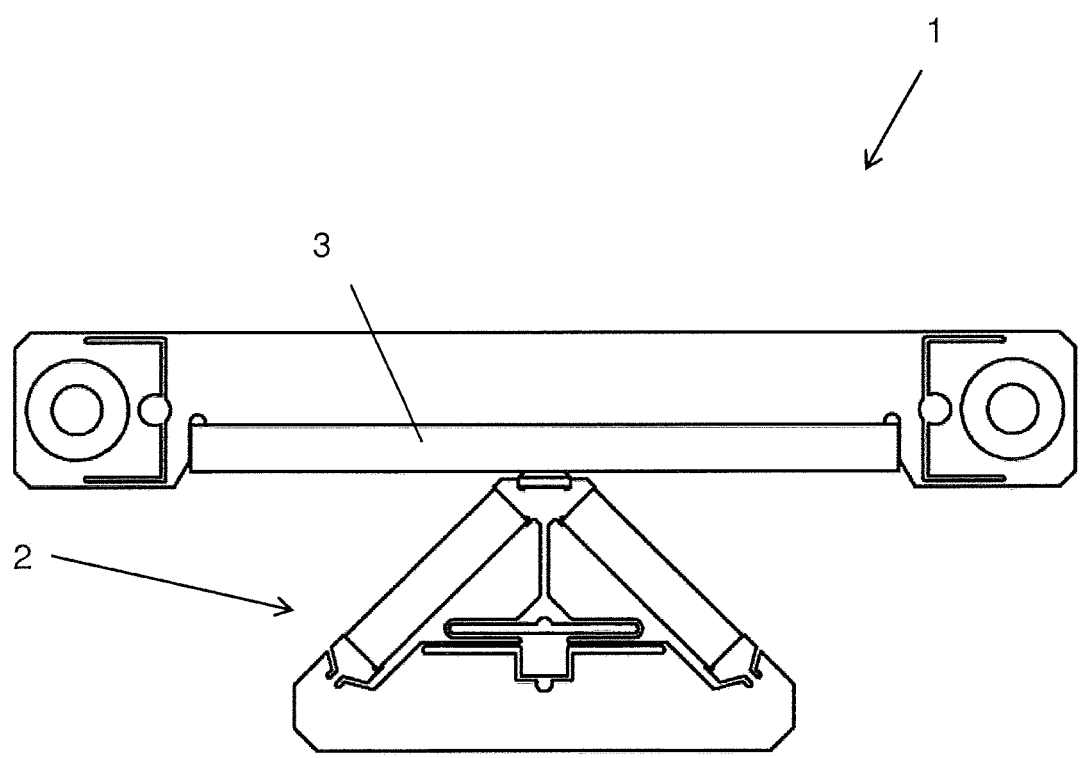
FIG. 8 shows a side view of a piezoelectric stepper drive according to a fourth embodiment of the invention, where the driven member is mounted in an elastically deformable manner and the drive apparatuses act upon the driven member from the same side.

Fourth Embodiment (FIG. 8)

FIG. 8 shows a side view of a piezoelectric stepper drive 1 according to a fourth embodiment of the invention with a drive apparatus 2 according to FIG. 2, where driven member 3 is there mounted in an elastic manner in a frame comprising a flexure hinge.

The configuration and the operating principle of piezoelectric stepper drive 1 according to the invention can be described in other words as follows:

The invention provides a self-locking stepper drive 1 with at least one drive apparatus 2 and an element (driven member) 3 driven thereby, where each drive apparatus 2 comprises a frame 20 with elastically deformable sections 212, 222, into which at least four electromechanical actuators 213, 214, 223 are inserted, where two respectively associated actuators 213, 214 or 223, 224, respectively, with their one end abut against a common drive section 21, 22 of frame 20 and at their other end are supported against a support section 215, 216 or 225, 226, respectively, of frame 20. In a de-energized state of actuators 213, 214 or 223, 224, respectively, drive sections 21, 22 are pressed against element (driven member) 3 to be driven.

The stepper drive according to the invention is self-locking in a resting state and does not generate heat since no actuation with control voltages is required. It is based on a non-magnetic and vacuum-compatible operating principle.

Fifth Embodiment (FIG. 9)

FIG. 9 in view (a) shows a top view and in view (b) a side view of a piezoelectric stepper drive 1 according to a fifth embodiment of the invention. Drive apparatus 2 is preferably configured to be identical to that of one of the preceding embodiments. In the present embodiment, driven member 3 comprises a preferably exactly or substantially cuboid-shaped body 30, the largest sides of which in terms of area are facing, firstly, drive apparatus 2 and, secondly, a guide device 5. The advance direction V of driven member 3 is perpendicular to the smallest side in terms of area of body 30 and/or parallel to the other sides thereof. Located on the front side of body 30 facing drive apparatus 2 is running surface 31 of driven member 3, which interacts with the drive sections of drive apparatus 2 and is driven by them. Running surface 31 is preferably configured as a running channel and aligned parallel to the advance direction V of driven member 3, so that the advance of driven member 3 caused by the drive sections relative to drive apparatus 2 is guided in the advance direction V of driven member 3.

Extending on the rear side of body 30 facing guide device 5 e.g. in the middle thereof, is a web 32 parallel to the advance direction V of driven member 3. In view (a) of FIG. 9, which is perpendicular to the advance direction V of driven member 3, this web 32 has a substantially triangular cross-sectional profile with a tip facing guide device 5 and/or or with two flanks aligned at an acute angle, for example, 45° to the rear side of body 30.

Guide device 5 comprises an elongate approximately cuboid-shaped body 50, the longest side surfaces of which are aligned exactly or substantially parallel to the advance direction V of driven member 3. Starting out from a cuboid basic shape, body 50 of guide device 5 comprises inclined surfaces 51 between the side directly facing driven member 3 and the adjoining side surfaces, which form an acute angle of preferably exactly or substantially 45° with the rear side of driven member 3. A total of four rollers 52 are mounted at these inclined surfaces of guide device 5. The axes of rotation of rollers 52 are each aligned perpendicular to one of the inclined surfaces of guide device 5 and at an acute angle of preferably exactly or substantially 45° to the rear side of driven member 3. The axes of rotation and lateral surfaces of rollers 52 are matched to the flanks on web 52 of driven member 3 such that rollers 52, with a motion of driven member 3, roll along the advance direction V on the respective flanks of web 32 of driven member 3. Driven member 3 and/or guide device 5 is/are preferably formed/ arranged in mirror-image symmetry with respect to the plane of symmetry which includes the advance direction of driven member 3 and extends between the drive sections of the same drive apparatus 2. The interaction of driven member 3, guide device 5, and drive apparatus 2 enables independent alignment of drive apparatus 2 relative to driven member 3.

LIST OF REFERENCE NUMERALS

1 piezoelectric stepper drive
2 drive apparatus(es)
20 frame (of the drive apparatus)
21 first drive section
210 contact section (friction nose) (of the first drive section)
211, 221 spring section
211a first wedge section
211b web
211c second wedge region
211d first plate package
211e clamping block
211f second plate package
212, 222 flexure hinge
213, 214 actuators (of the first drive section)
215, 216 support sections (of the first drive section)
22 second drive section
220 contact section (friction nose) (of the second drive section)
223, 224 actuators (of the second drive section)
225, 226 support sections (of the second drive section)
3 driven member
30 body
31 web
32 running surface
4 base frame
41 first section
42 flexible section
43 second section
5 guide device
50 body
51 inclined surface
52 roller
V advance direction

The invention claimed is:

1. A piezoelectric stepper drive, comprising:
at least one drive apparatus with at least two drive sections which are drivable independently of each other and each arranged to be acted upon by at least two piezoelectric actuators; and
a driven member which is arranged to be advanced by at least one of said at least two drive sections when control voltages are applied to said at least two piezoelectric actuators, where said at least one drive apparatus is configured approximately in a triangle shape, at a tip of which said at least two drive sections are arranged, said at least one drive apparatus being in mirror-image symmetry to a plane of symmetry that includes an advance direction of said driven member and extends between said at least two drive sections of the same at least one drive apparatus, and wherein at least one of said at least two drive sections is biased against said driven member in an absence of control voltages applied to said at least two piezoelectric actuators such that said at least one drive section will block the advance of said driven member, where each of said at least two drive sections is mounted individually resilient relative to a base of said triangle shape.

2. The piezoelectric stepper drive according to claim 1, wherein said at least one drive apparatus comprises:
a deformable frame into which said at least two piezoelectric actuators are inserted such that said at least two piezoelectric actuators for respectively acting upon a drive section of said at least two drive sections abut with one of their respective ends against said drive section of said at least two drive sections of said deformable frame that is common to them, and with their other end are supported against a support section of said deformable frame.

3. The piezoelectric stepper drive according to claim 2, wherein said deformable frame (20) comprises:
elastically deformable sections.

4. The piezoelectric stepper drive according to claim 3, wherein at least one of said elastically deformable sections is configured as a spring section or as a flexure hinge, where at least one of said elastically deformable sections is arranged between at the support section and a base of said deformable frame and/or between at least one of said at least two drive sections and said base of said deformable frame.

5. The piezoelectric stepper drive according to claim 4, wherein said actuators at least in sections form legs of said triangle shape and are fixed to a base of said triangle shape in an articulated manner.

6. The piezoelectric stepper drive according to claim 5, comprising:
at least two drive apparatuses which are arranged on the same side or on different sides of said driven member, where said at least two drive apparatuses are arranged in mirror-image symmetry and/or said at least two drive sections are deflectable in mirror-image symmetry and/or said at least two piezoelectric actuators associated with said at least two drive sections are connected in mirror-image symmetry.

7. The piezoelectric stepper drive according to claim 6, wherein said driven member is configured and/or mounted in an elastically deformable manner and, in an absence of control voltages at said at least two piezoelectric actuators, will be biased by restoring forces against said at least one drive apparatus due to elastic deformation.

8. The piezoelectric stepper drive according to claim 7, wherein the at least one drive apparatus is arranged on a base frame, where said base frame comprises:
elastically deformable sections, formed as flexure hinges, so that said at least one drive apparatus is mountable on said base frame in such an elastic manner that at least one of its at least two drive sections, in an absence of the control voltages at said at least two piezoelectric actuators, will be biased by restoring forces against said driven member due to elastic deformation.

9. The piezoelectric stepper drive according to claim 8, wherein said driven member is mounted and/or configured and/or said at least one drive apparatus is mounted and/or said base frame is configured such that an increase in a biasing force between one of said at least two drive sections of said at least one drive apparatus and said driven member will lead to a decrease in a biasing force between another of the at least two drive sections of said at least one drive apparatus and said driven member.

10. The piezoelectric stepper drive according to claim 1, wherein said at least two piezoelectric actuators, at least in sections, form legs of said triangle shape and are fixed to a base of said triangle shape in an articulated manner.

11. The piezoelectric stepper drive according to claim 1, wherein the at least one drive apparatus comprises:
   at least two drive apparatuses which are arranged on the same side or on different sides of said driven member, where said at least two drive apparatuses are arranged in mirror-image symmetry and/or said at least two drive sections are deflectable in mirror-image symmetry and/or said at least two piezoelectric actuators associated with said at least two drive sections are connected in mirror-image symmetry.

12. The piezoelectric stepper drive according to claim 1, wherein said driven member is configured and/or mounted in an elastically deformable manner and, in an absence of control voltages at said at least two piezoelectric actuators, will be biased by restoring forces against said at least one drive apparatus due to elastic deformation.

13. The piezoelectric stepper drive according to claim 1, wherein the at least one drive apparatus is arranged on a base frame, where said base frame comprises:
   elastically deformable sections, formed as flexure hinges, so that said at least one drive apparatus is mountable on said base frame in such an elastic manner that at least one of its at least two drive sections, in an absence of the control voltages at said at least two piezoelectric actuators, will be biased by restoring forces against said driven member due to elastic deformation.

14. The piezoelectric stepper drive according to claim 13, wherein said driven member is mounted and/or configured and/or said at least one drive apparatus is mounted and/or said base frame is configured such that an increase in a biasing force between one of said at least two drive sections of said at least one drive apparatus and said driven member will lead to a decrease in a biasing force between another of the at least two drive sections of said at least one drive apparatus and said driven member.

15. The piezoelectric stepper drive according to claim 1, wherein said piezoelectric stepper drive comprises:
   a guide device for guiding said driven member in an advance direction relative to said at least one drive apparatus.

16. A method for actuating a piezoelectric stepper drive having a piezoelectric drive apparatus, with at least a first drive section and a second drive section, which are drivable independently of each other and each arranged to be acted upon by at least two piezoelectric actuators, the method comprising:

a. step A: actuating a second set of actuators associated with the at least one second drive section and optionally actuating a first set of actuators associated with said at least one first drive section, so that a biasing force applied to a driven member by said first drive section is reduced or cancelled;

b. step B: actuating said second set of actuators so that said second drive section transmits drive forces onto said driven member and said driven member is advanced in a drive direction;

c. step C: changing control voltages applied to said second set of actuators and optionally changing control voltages applied to said first set of actuators to restore contact between said first drive section and said driven member, where said first and said second drive sections are offset from each other in the drive direction of said driven member;

d. step D: actuating said first set of actuators and optionally actuating said second set of actuators so that the biasing force applied to said driven member by said second drive section is reduced or canceled;

e. step E: actuating said first set of actuators so that said first drive section transmits drive forces onto said driven member and said driven member is advanced in the drive direction;

f. step F: changing control voltages applied to said first set of actuators and optionally changing control voltages applied to said second set of actuators to restore the contact between said second drive section and said driven member; and optionally g. repeating steps A to F, where step B is modified for each repetition such that said second set of actuators and said first set of actuators are actuated so that said second drive section causes an advance of said driven member in the drive direction and said first drive section performs a motion in a direction substantially opposite to the drive direction.

17. The method for actuating a piezoelectric stepper drive according to claim 16, where step B additionally comprises:
   actuation of said first set of actuators so that said first drive section performs a motion in the direction substantially opposite to the drive direction, and/or in step E said second set of actuators are additionally actuated so that said second drive section performs a motion in a direction substantially opposite to the drive direction.

* * * * *